United States Patent [19]

Iijima

[11] Patent Number: 5,293,029
[45] Date of Patent: Mar. 8, 1994

[54] SYSTEM FOR MUTUALLY CERTIFYING AN IC CARD AND AN IC CARD TERMINAL

[75] Inventor: Yasuo Iijima, Yokohama, Japan

[73] Assignee: Kabushiki Kaisha Toshiba, Kawasaki, Japan

[21] Appl. No.: 942,337

[22] Filed: Sep. 9, 1992

Related U.S. Application Data

[63] Continuation of Ser. No. 747,420, Aug. 19, 1991, abandoned, which is a continuation of Ser. No. 463,601, Jan. 11, 1990, abandoned.

[30] Foreign Application Priority Data

Jan. 17, 1989 [JP] Japan ................................. 1-8010
Jan. 17, 1989 [JP] Japan ................................. 1-8011

[51] Int. Cl.⁵ .......................... G06K 5/00; H04L 9/14
[52] U.S. Cl. .................................... 235/380; 380/28
[58] Field of Search ............ 235/379, 380, 382, 382.5; 340/825.3, 825.31, 825.34; 380/23, 28, 29, 30

[56] References Cited

U.S. PATENT DOCUMENTS

| | | | |
|---|---|---|---|
| 4,074,079 | 2/1978 | Prell et al. | 340/28 X |
| 4,630,201 | 12/1986 | White | 235/379 |
| 4,665,396 | 5/1987 | Dieleman | 340/825.34 X |
| 4,746,788 | 5/1988 | Kawana | 235/380 |
| 4,757,534 | 7/1988 | Matyas et al. | 235/380 |
| 4,799,635 | 1/1989 | Nakagawa | 340/825.31 X |
| 4,823,388 | 4/1989 | Mizutani et al. | 380/23 |
| 4,853,962 | 8/1989 | Brockman | 380/28 X |
| 4,862,501 | 8/1989 | Kamitake et al. | 235/380 |
| 4,910,774 | 3/1990 | Barakat | 235/380 |
| 4,935,962 | 6/1990 | Austin | 380/25 |
| 4,961,142 | 10/1990 | Elliott et al. | 235/380 |
| 5,109,152 | 4/1992 | Takagi et al. | 235/380 |

FOREIGN PATENT DOCUMENTS

| | | | |
|---|---|---|---|
| 119707 | 9/1984 | European Pat. Off. | |
| 0223122 | 5/1987 | European Pat. Off. | 340/825.34 |
| 2144564 | 3/1985 | United Kingdom | 340/825.34 |

OTHER PUBLICATIONS

Takaragi, K. et al., "Certification System for Electronic Transaction Using IC Cards", Institute of Electric Engineering of Japan, Transaction, 1987, vol. 107-C, No. 1, pp. 46-53.

Primary Examiner—Samuel A. Turner
Assistant Examiner—Edward H. Sikorski
Attorney, Agent, or Firm—Cushman, Darby & Cushman

[57] ABSTRACT

A mutual certification method includes an IC card having a random number generator, a plurality of key data and a plurality of encryption algorithms, and an IC card terminal which also has a random number generator, a plurality of key data and a plurality of encryption algorithms. The key data and encryption algorithm to be used are designated, and a random number may be transmitted for encryption and return, so that mutual certification may be performed.

2 Claims, 14 Drawing Sheets

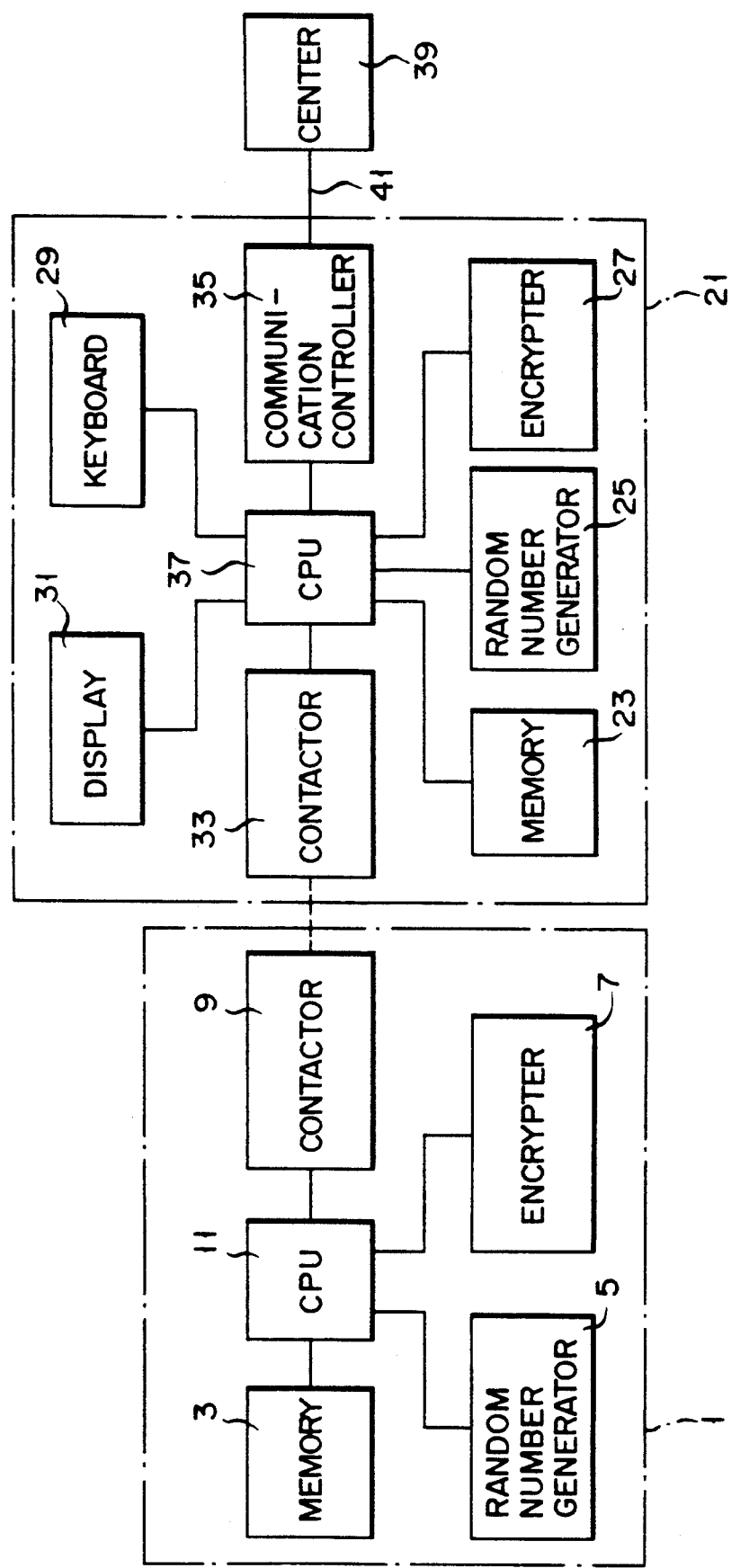
F I G. 1

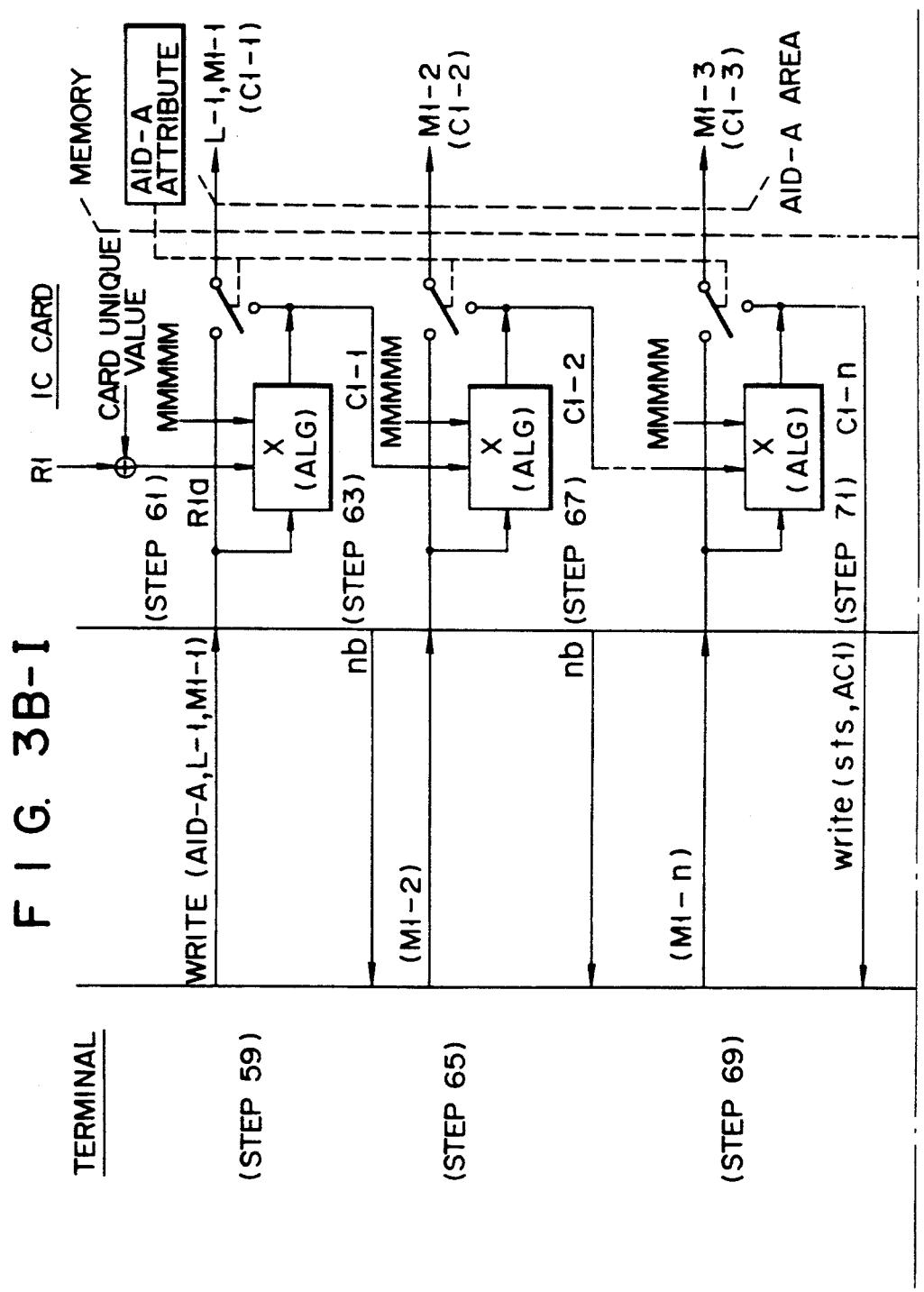
FIG. 3B-I

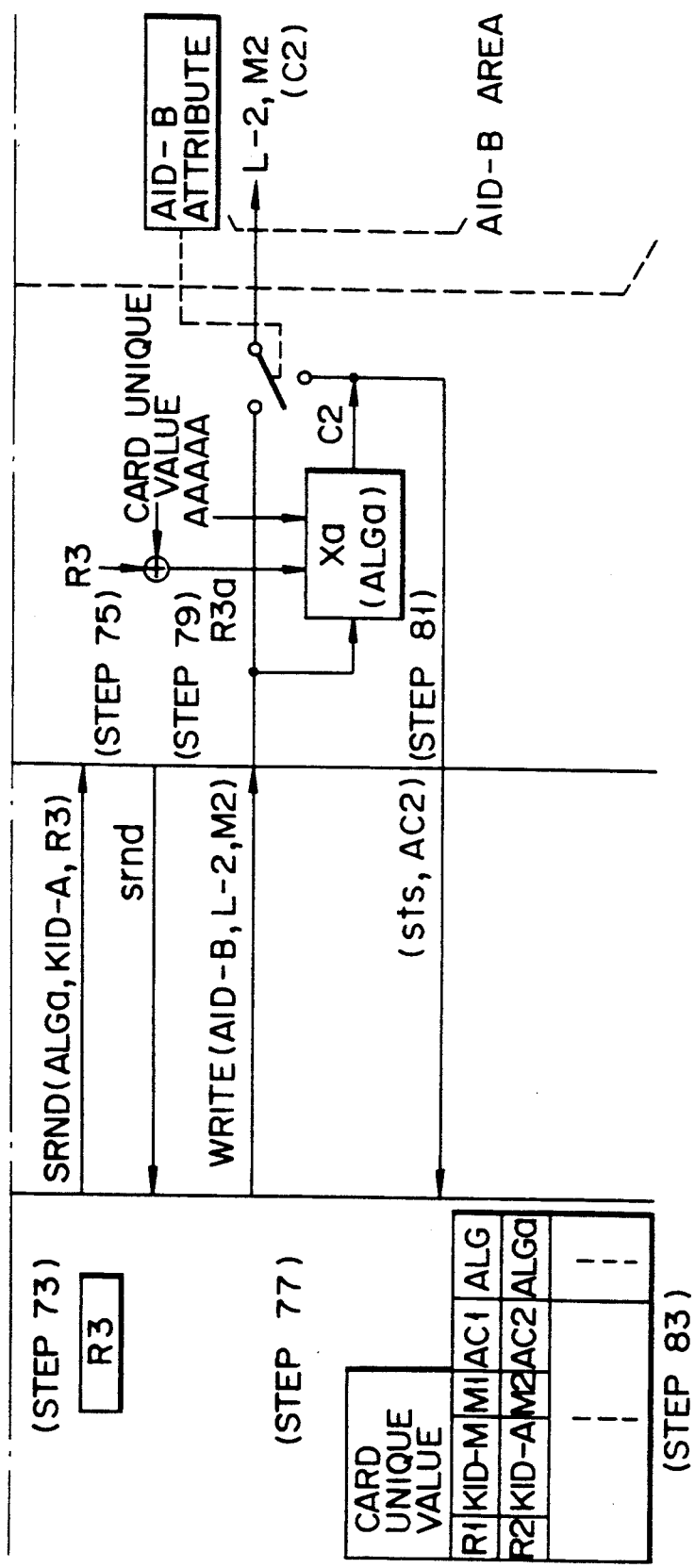
FIG. 3B-II

| FUNCTION CODE | KID | ALG | R1 |
|---|---|---|---|

FIG. 5

| FUNCTION CODE | DATA STRING |
|---|---|

FIG. 6

| FUNCTION CODE | KID | ALG | R3 |
|---|---|---|---|

FIG. 7

| FUNCTION CODE | AID | LX | DATA FIELD |
|---|---|---|---|

FIG. 8A

| | DATA FIELD |
|---|---|

CONTINUATION REQUEST FUNCTION CODE

FIG. 8B

SYSTEM FOR MUTUALLY CERTIFYING AN IC CARD AND AN IC CARD TERMINAL

This is a continuation of application Ser. No. 07/747,420, filed Aug. 19, 1991, the filing hereof; which is a continuation of application Ser. No. 07/463,601, filed Jan. 11, 1990, both now abandoned.

BACKGROUND OF THE INVENTION

1. Field of the Invention

The present invention relates to a certification system and method for verifying data to be written in, e.g., a memory in an IC card.

2. Description of the Related Art

As a new portable data storage medium, a great deal of attention has recently been paid to a so-called IC card incorporating an IC chip having an erasable non-volatile memory and a control element, such as a CPU, for controlling the respective components including the memory.

In a conventional IC card system using such IC cards, e.g., a shopping system or a credit system, when a data write operation is to be performed with respect to an IC card (a memory in the IC card), especially, transaction data is to be written, the transaction data sent to a center (host computer) cannot be verified on the center side.

For this reason, the following certification system and method are proposed.

When an IC card receives a data write instruction from a terminal, the write data is encrypted within the IC card by using predetermined key data and encryption algorithm. Part of the encrypted data is supplied to the terminal. The terminal then supplies the encrypted data and the write data to the center. The write data is verified in the center by using these data.

In such a certification method, however, if IC cards are used in a plurality of applications as they are increasingly used for various purposes, in order to ensure security between the respective applications, it is effective to use different key data for verification which are saved in the applications for verification.

In the above-described certification method, if identical write data, key data, and encryption algorithms are used, the same encrypted data is output from an IC card. Therefore, verification of transaction data becomes difficult.

Furthermore, in such a certification method, special instructions for designating key data and encryption algorithms which are used to encrypt write data within an IC card must be supported.

SUMMARY OF THE INVENTION

It is an object of the present invention to provide a certification system and method of a portable electronic device in which even if an IC card is used in a plurality of applications, key data and encryption algorithms for verification can be selectively used for each application so as to ensure security between the applications.

It is another object of the present invention to provide a certification system and method in which even if identical write data, key data, and encryption algorithms are used, different encrypted data are output as long as the time at which a write operation is performed varies, thereby facilitating verification.

It is still another object of the present invention to provide a certification system in which no special instructions for designating key data and encryption algorithms used for encrypting data are required, and hence the load of an IC card can be reduced.

According to a first aspect of the present invention, there is provided a certification system, comprising a first electronic device having at least one key data, a second electronic device capable of performing communication with the first electronic device, means for transmitting first data and designation data for designating key data for encrypting the first data from the second electronic device to the first electronic device, means for, when the first data and the designation data are received by the first electronic device, selecting one key data from the at least one key data in accordance with the received designation data, and encrypting the received first data by using the selected key data, and means for transmitting part of the encrypted data to the second electronic device after the first data is entirely received by the first electronic device.

According to a second aspect of the present invention, there is provided a certification system, comprising a first electronic device having at least one key data and at least one encryption algorithm, a second electronic device capable of performing communication with the first electronic device, means for transmitting first data, key data for encrypting the first data, and designation data for designating an encryption algorithm from the second electronic device to the first electronic device, means for, when the first data and the designation data are received by the first electronic device, selecting one key data and one encryption algorithm from the at least one key data and the at least one encryption algorithm in accordance with the received designation data, and encrypting the received first data by using the selected key data and encryption algorithm, and means for transmitting part of the encrypted data to the second electronic device after the first data is entirely received by the first electronic device.

According to a third aspect of the present invention, there is provided a certification system, comprising a first electronic device having key data and an encryption algorithm, a second electronic device capable of performing communication with the first electronic device, means for transmitting first data and second data whose contents vary in each operation from the second electronic device to the first electronic device, means for, when the first and second data are received by the first electronic device, encrypting the received first data by using the received second data, the key data, and the encryption algorithm, and means for transmitting part of the encrypted data to the second electronic device after the first data is entirely received by the first electronic device.

According to a fourth aspect of the present invention, there is provided a certification system, comprising a first electronic device having at least one key data and at least one encryption algorithm, a second electronic device capable of performing communication with the first electronic device; means for transmitting first data, key data for encrypting the first data, and designation data for designating an encryption algorithm from the second electronic device to the first electronic device, means for, when the first data and the designation data are received by the first electronic device, selecting one key data and one encryption algorithm from the at least one key data and the at least one encryption algorithm in accordance with the received designation data, encrypting the received first data by using the selected key data and encryption algorithm, and transmitting the encrypted data to the second electronic device, means for, when the encrypted data is received by the second electronic device, verifying the first electronic device on the basis of contents of the received encrypted data, means for transmitting second data from the second electronic device to the first electronic device, means for, when the second data is received by the first electronic device, encrypting the received second data by using the key data and encryption algorithm selected on the basis of the designation data; and means for transmitting part of the encrypted data from the first electronic device to the second electronic device.

According to the present invention, one of a plurality of key data held in the IC card is designate by the terminal, and write data is encrypted by using the designated key data. Therefore, even if the IC card is used in a plurality of applications, verification key data can be selectively used for each application, and security between the applications can be ensured.

In addition, one key data and one encryption algorithm of a plurality of key data and encryption algorithms held in the IC card are designated by the terminal, and write data is encrypted by using the designated key data and encryption algorithm. Therefore, even if the IC card is used in a plurality of applications, verification key data can be selectively used for each application, and security between the applications can be ensured.

Furthermore, by encrypting write data by using data which varies in content in each operation and is transmitted from the terminal to the IC card, different encrypted data are output as long as write operations are performed at different points of time, even if identical write data, key data, and encryption algorithms are used. Therefore, verification can be facilitated.

BRIEF DESCRIPTION OF THE DRAWINGS

FIG. 1 is a block diagram showing a system arrangement of an IC card, a terminal, and a center, to which a certification system of the present invention is applied;

FIGS. 3A, 3B-I, 3B-II, and 3C are views showing a procedure for a mutual certification operation between the IC card and the terminal, and a procedure for writing data from the terminal to the IC card;

FIG. 5 is a view showing a format of a certificate preparation command;

FIG. 6 is a view showing a format of a certificate command;

FIG. 7 is a view showing a format of an encryption preparation command; and

FIGS. 8A and 8B are views showing formats of a write command.

DETAILED DESCRIPTION OF THE PREFERRED EMBODIMENTS

Figure 2:
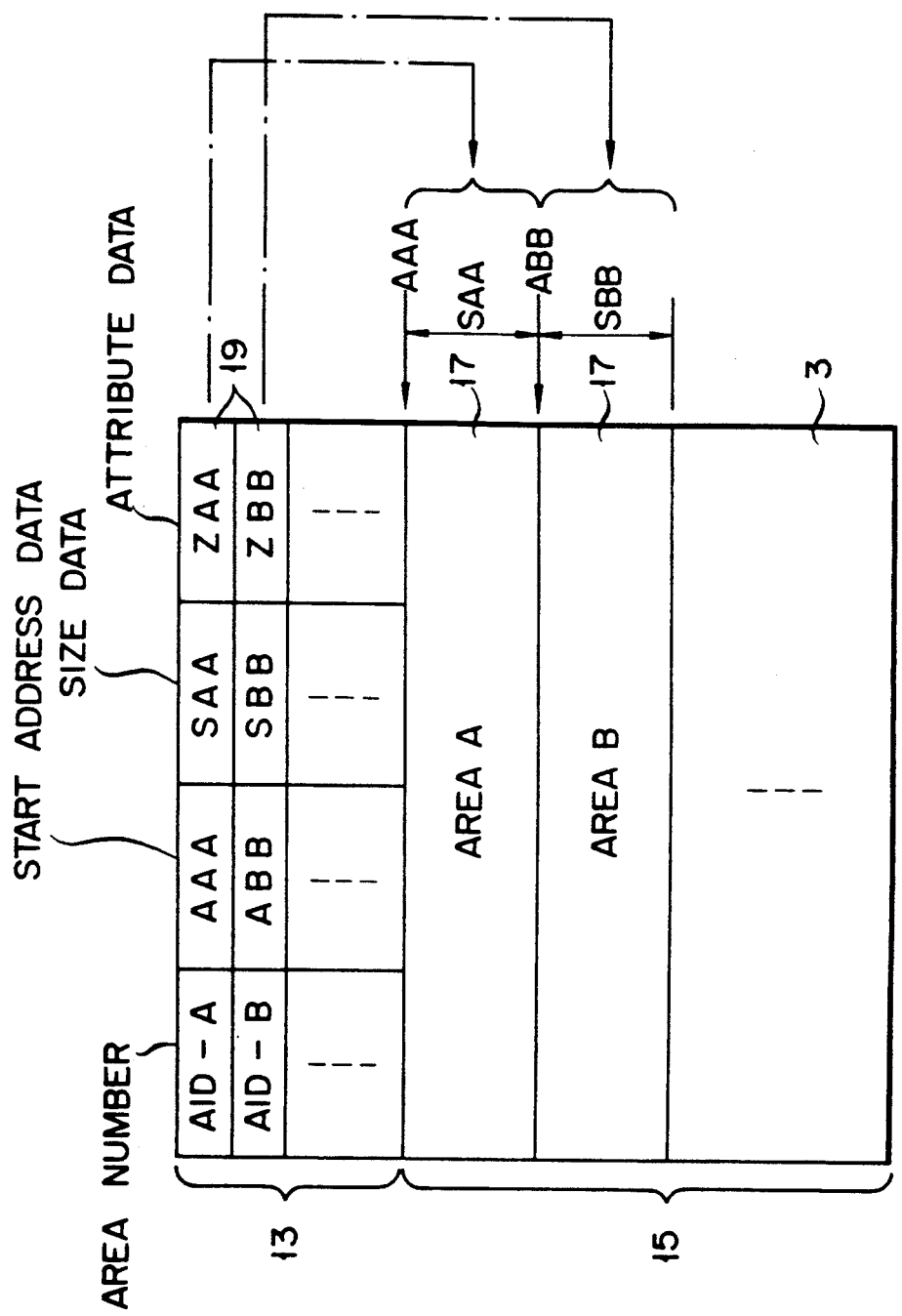
FIG. 2 is a view showing an arrangement of a memory 3 within the IC card in FIG. 1.

FIG. 1 shows an arrangement of a system constituted by an IC card (first electronic device), a terminal (second electronic device) as a host device, and a center (host computer) according to the present invention.

An IC card 1 comprises a memory 3 for storing various data, a random number generator 5 for generating random number data, an encrypter 7 for encrypting data, a contactor 9 for communicating with a terminal 21 (to be described later), and a control element 11 such as a CPU (Central Processing Unit) for controlling these components. The memory 3, the random number generator 5, and the control element 11 are integrated into, e.g., one IC chip (or a plurality of IC chips), and are embedded in an IC card body.

The memory 3 is constituted by a nonvolatile memory, such as an EEPROM (Electrically Erasable Programmable Read Only Memory), and is divided into an area definition table (area) 13 and a data file (area) 15, as shown in FIG. 2. The data file 15 is divided into a plurality of areas 17. The areas 17 are respectively defined by area definition data 19 in the area definition table 13.

The area definition data 19 is a data string in which an area number (AID) as identification data for designating an area, start address data of the memory at which an area is assigned, size data for defining the capacity of an area, and attribute data are arranged to correspond to each other. Each attribute data consists of, e.g., one byte. If the MSB of attribute data is "0", it represents an encrypted data write area. If the MSB is "1", it represents an input data write area.

The terminal (second electronic device) 21 has a function of handling the IC card 1. The terminal 21 comprises a memory 23 for storing various data, a random number generator 25 for generating random number data, an encrypter 27 for encrypting data, a keyboard 29 for inputting data, a display 31 for displaying data, a contactor 33 for communicating with the IC card 1, a communication controller 35 for performing on-line communication through a center (host computer) 39 and a communication line 41, and a control section 37, such as a CPU, for controlling these components.

Figure 3A:
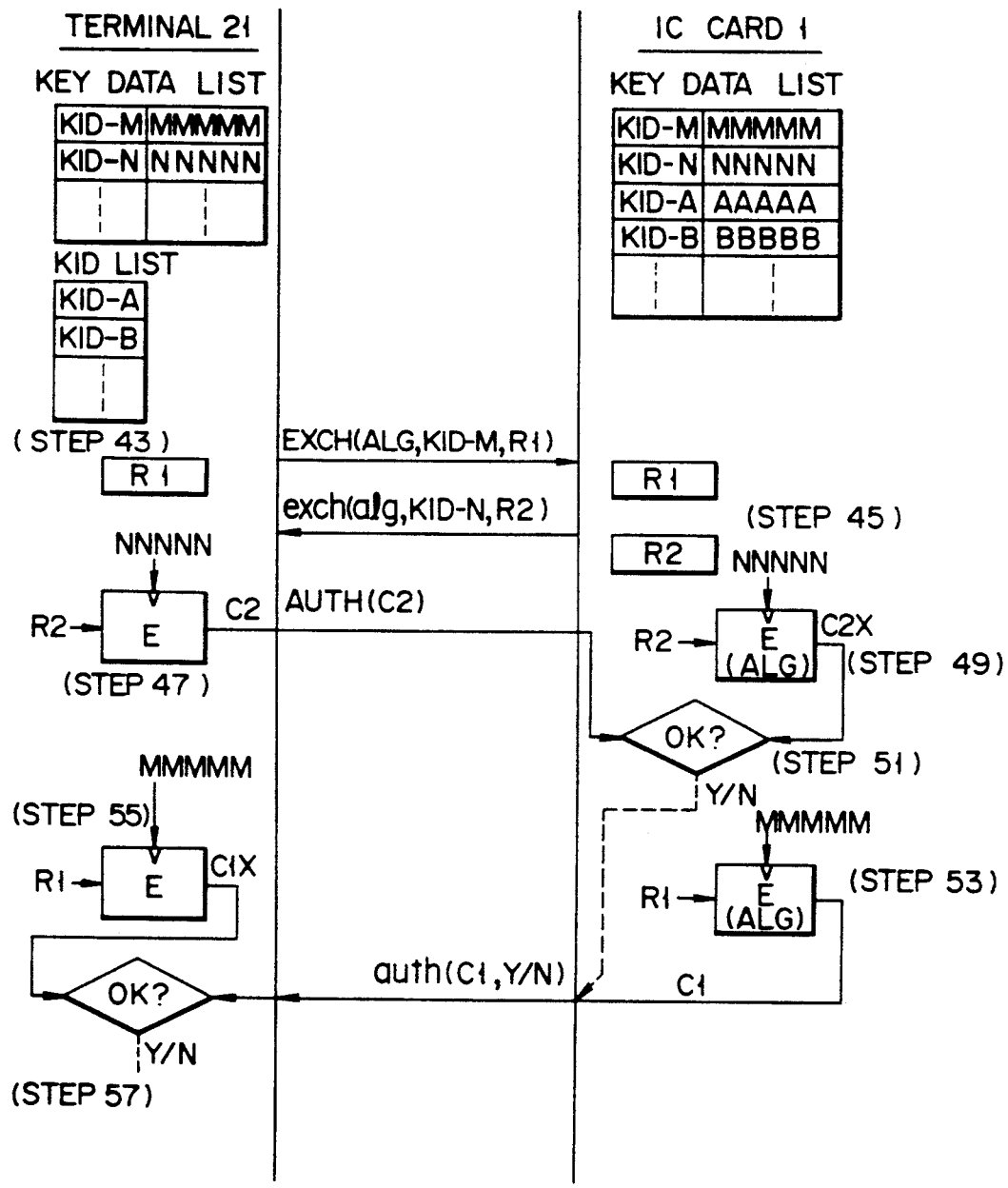
Figure 3C:
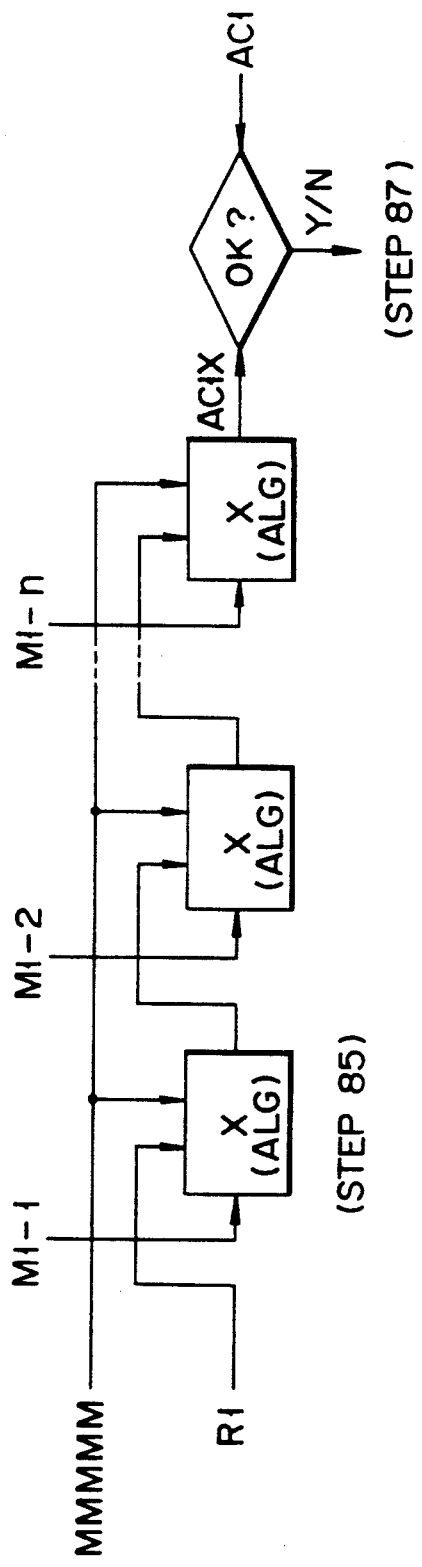
Figure 4A:
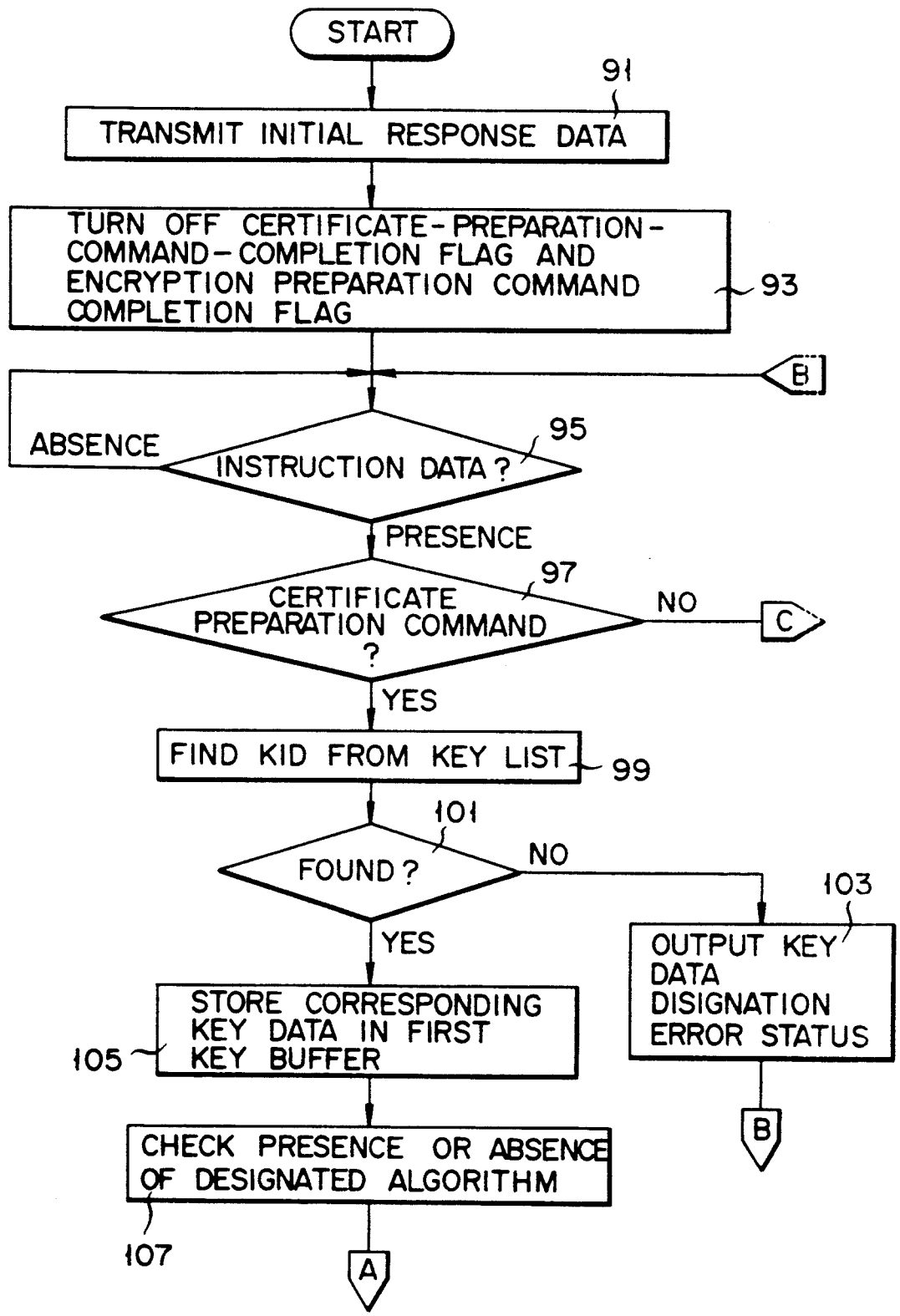
FIGS. 4A through 4G are flow charts for explaining an operation of the IC card.
Figure 4B:
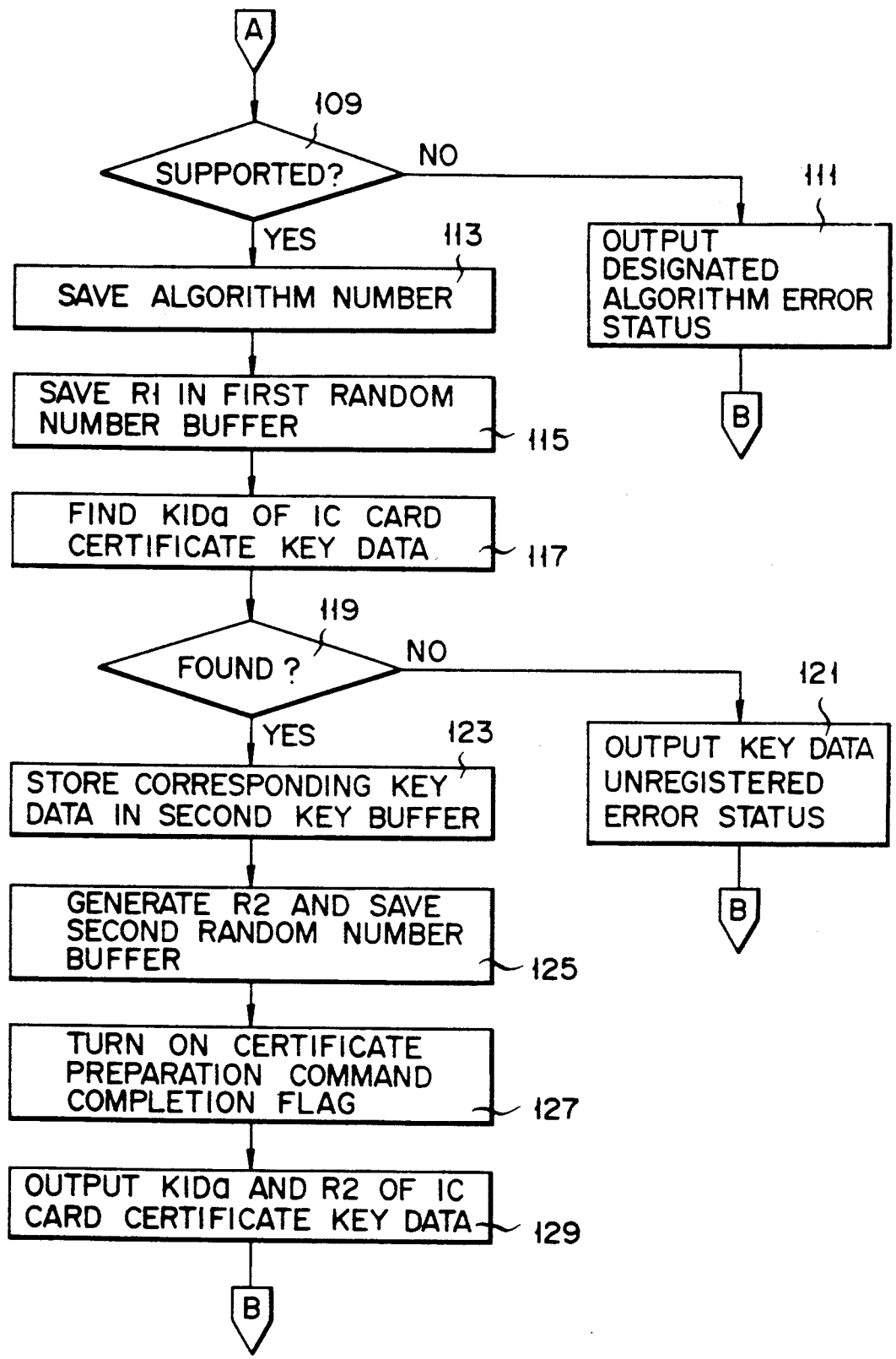
Figure 4C:
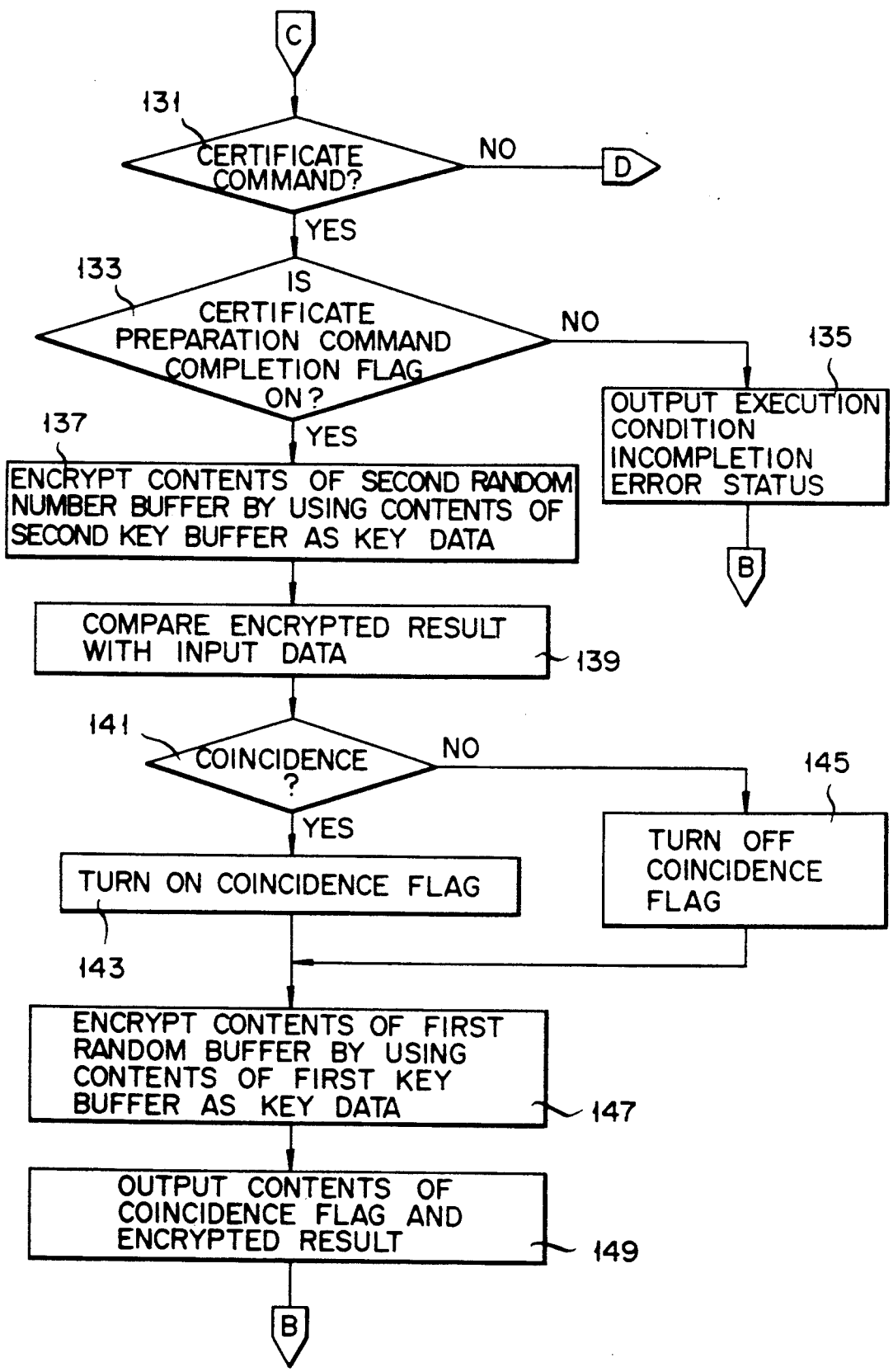
Figure 4D:
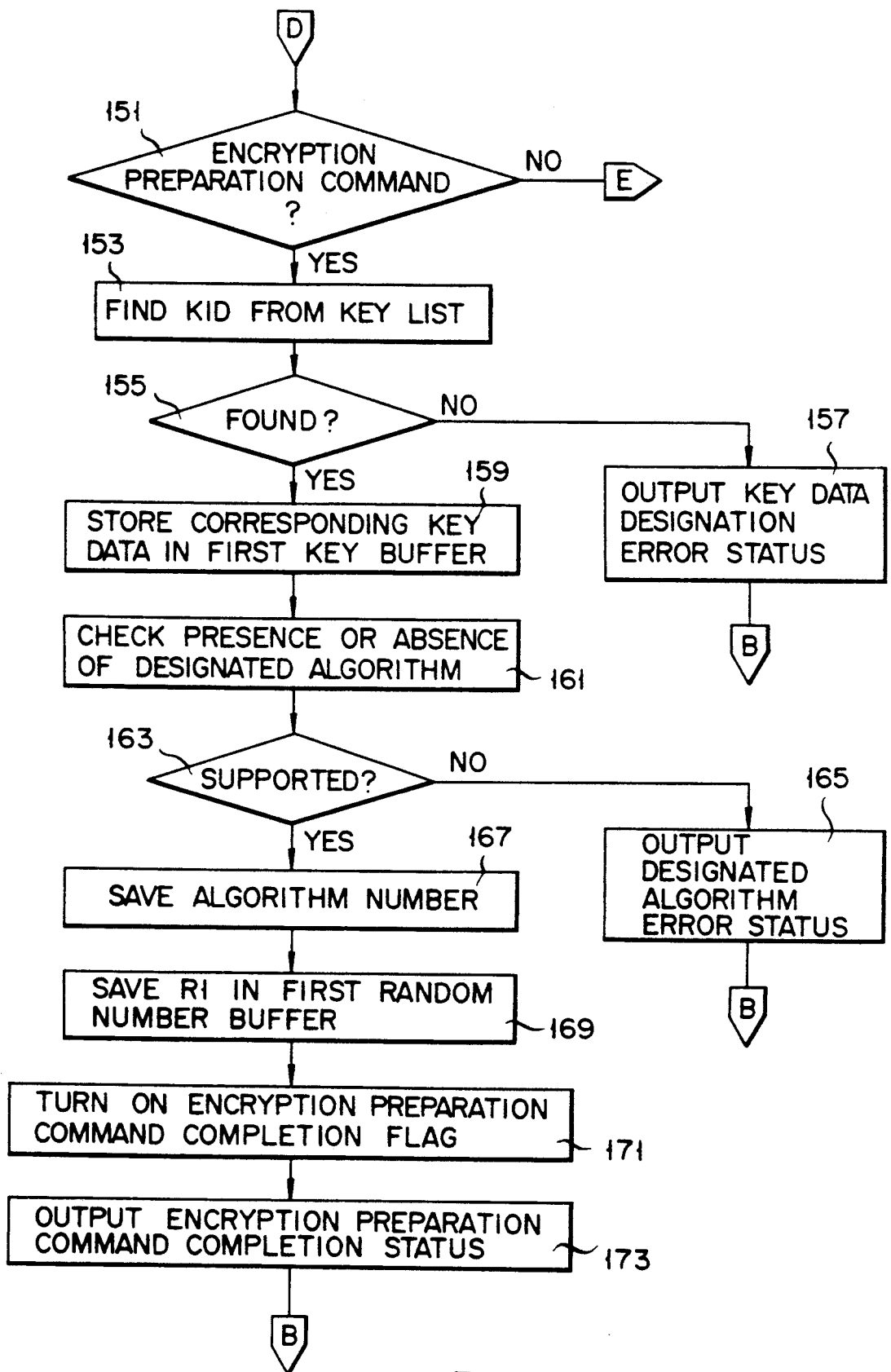
Figure 4E:
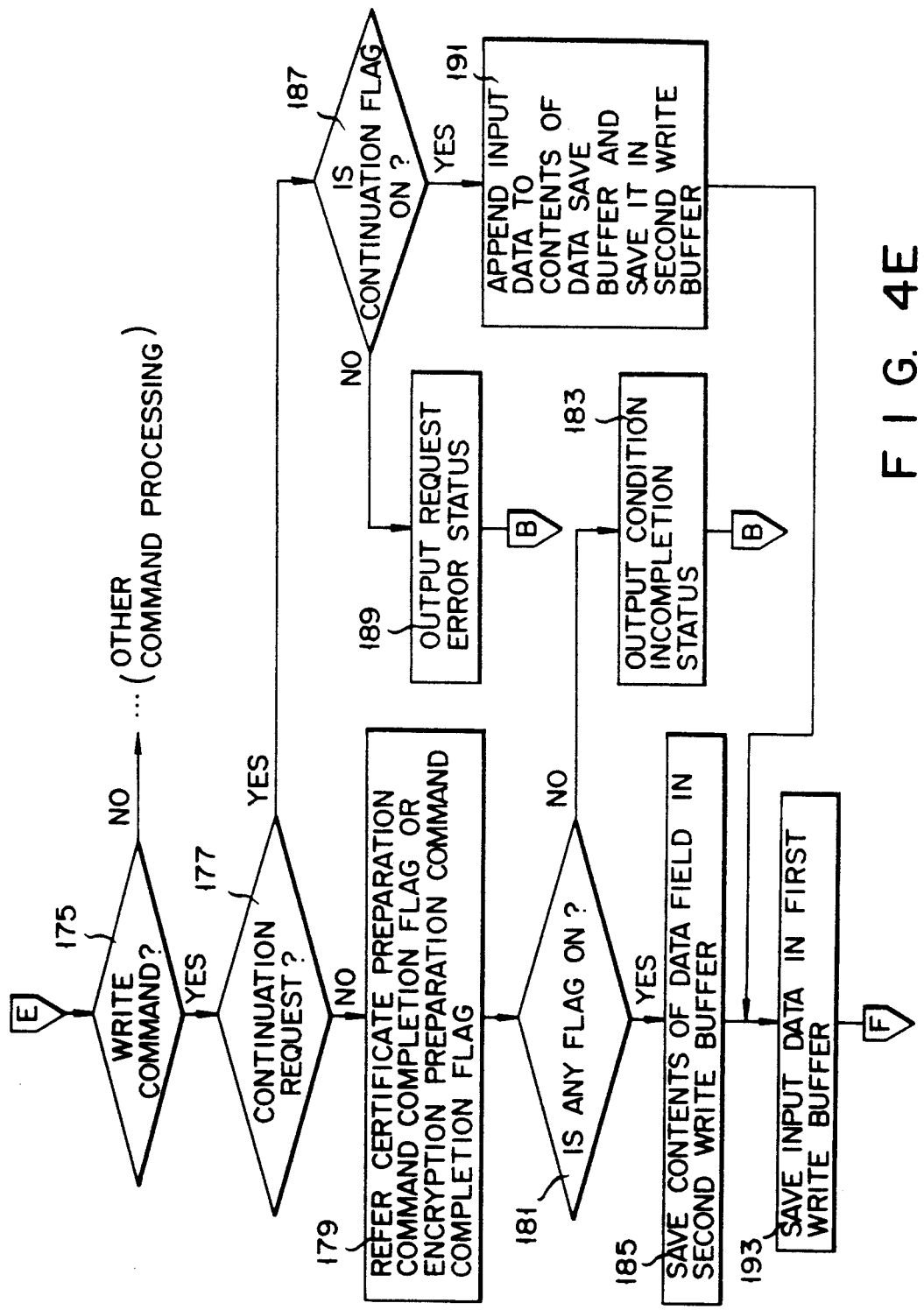
Figure 4F:
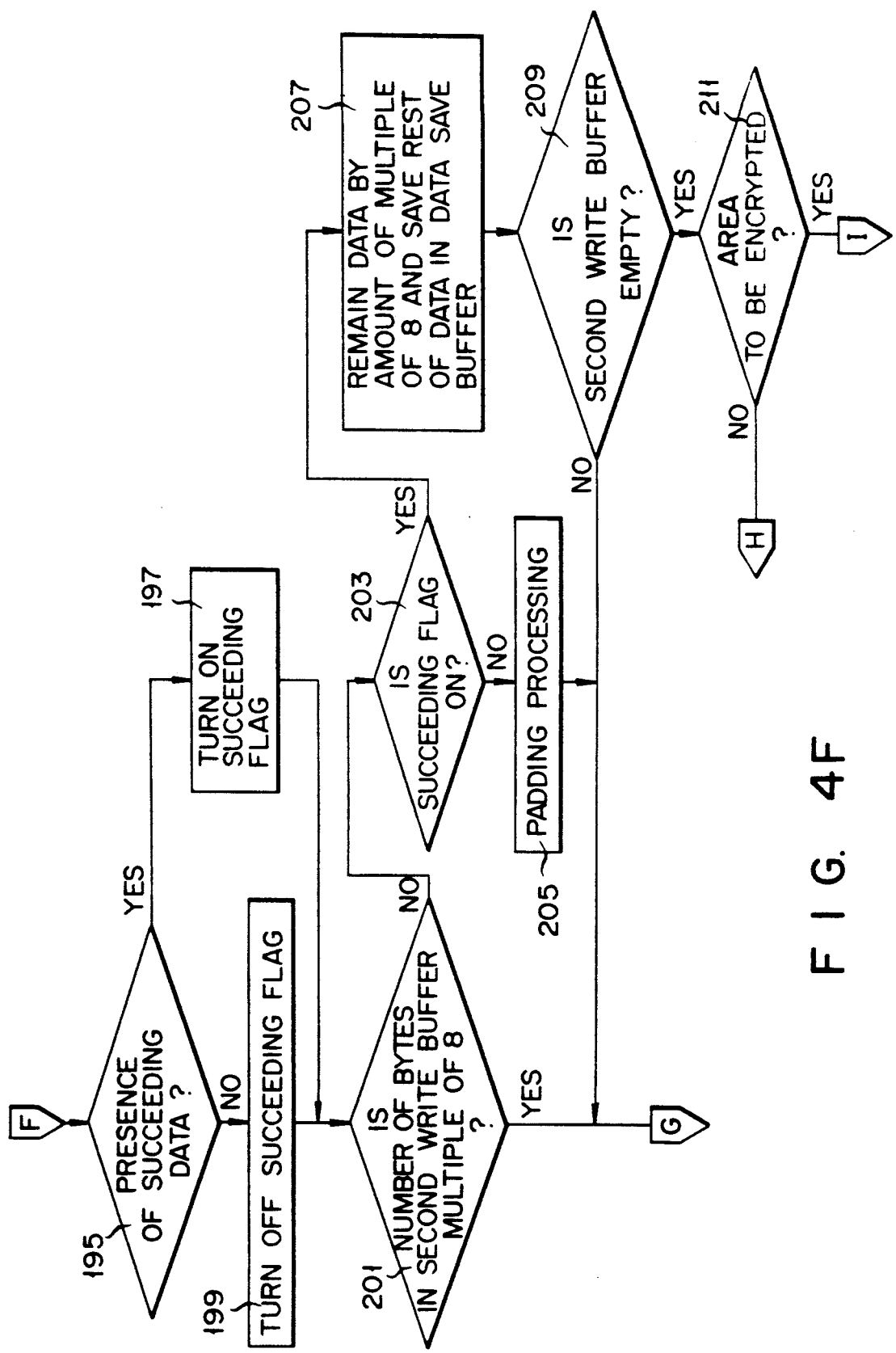
Figure 4G:
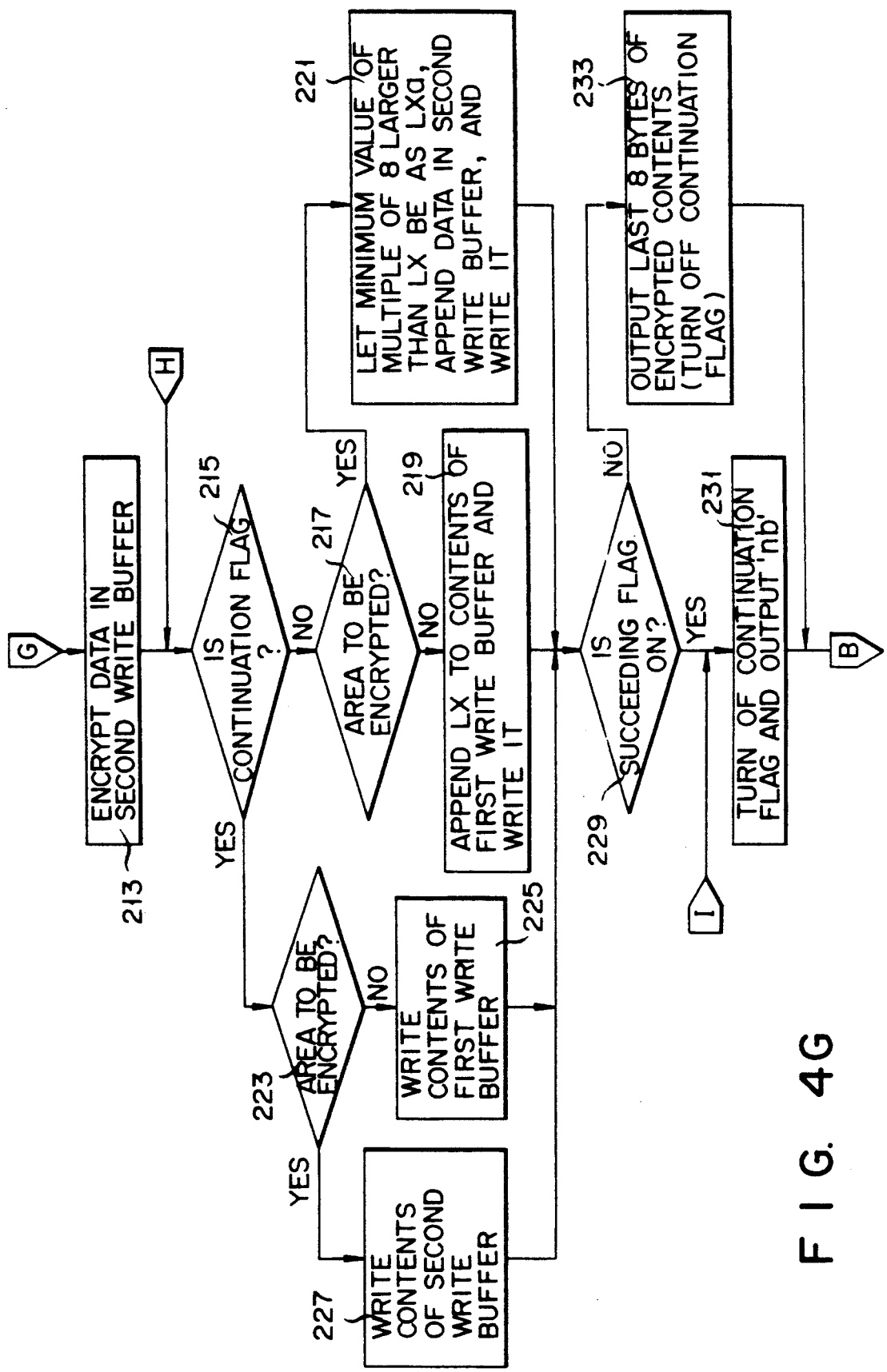

A certification system and method of the present invention will be described in detail below with reference to FIGS. 3A through 3C. Assume that a key data list and a key data number (KID) list shown in FIG. 3A are stored in the memory 23 of the terminal 21. A key data list is a list in which key data numbers and key data are arranged in correspondence with each other. A KID list lists only key data numbers for designating key data. The IC card 1 has its own key data list which is registered (stored) in the memory 3 in the IC card when the card is issued.

A process of mutual certification between the IC card 1 and the terminal 21 will be described below with reference to steps 43 through 57. In step 43, the terminal 21 generates random number data R1 by using the random number generator 25, and transmits it to the IC card 1 using a certificate preparation command EXCH. At this time, a key data number KID-M of key data which is used by the terminal 21 to certify the IC card, and data for designating an encryption algorithm ALG which is supported by the terminal 21 are also transmitted to the IC card 1.

In step 45, when the IC card 1 receives the certificate preparation command EXCH, it generates random number data R2 by using the random number generator 5, and transmits it to the terminal 21 as a response exch to the certificate preparation command EXCH. At this time, the IC card 1 finds a key data number KID-N of key data used for certifying the terminal 21 from its own key data number list, checks whether it supports the designated encryption algorithm (ALG), and transmits this checking result as "alg" to the terminal 21 together with the random number data R2.

If the key data number KID-M designated by the terminal 21 or the key data number KID-N which is used by the IC card 1 to certify the terminal 21 is not present in the key data number list, or the designated encryption algorithm is not supported, the IC card 1 notifies this to the terminal 21.

In step 47, the terminal 21 finds a key data number KID-N of the encryption key data designated by the IC card 1 from its own key data number list, and extracts corresponding key data NNNNN. The encrypter 7 then encrypts the random number data R2 by using the key data NNNNN in accordance with the encryption algorithm ALG designated by the certificate preparation command EXCH, thus obtaining encrypted data C2.

In step 51, the IC card 1 compares the encrypted data C2 obtained from step 47 with encrypted data C2X which is obtained by encrypting the previously-sent random number R2 using key NNNNN.

In step 53, the IC card 1 extracts a key data number MMMMM corresponding to the key data number KID-M of the encryption key data designated by the certificate preparation command EXCH from the terminal 21. The encrypter 7 then encrypts the random number data R1 by using the key data MMMMM in accordance with the encryption algorithm ALG, thus obtaining encrypted data C1. The IC card 1 transmits the encrypted data C1 and the comparison result Y/N in step 51, as a response auth to the certificate command AUTH, to the terminal 21.

In step 55, when the terminal 21 receives the response auth, it extracts key data MMMMM corresponding to the key data number KID-M of the previously-transmitted encryption key data. The encrypter 2 then encrypts the random number data R1 generated in step 43 by using the key data MMMMM in accordance with the encryption algorithm ALG, thus obtaining encrypted data C1X.

In step 57, the terminal 21 compares the encrypted data C1 received as the response auth with the encrypted data C1X generated in step 55, and determines the subsequent system processing on the basis of the comparison result and the comparison result which is received from the IC card 1 in step 51 using the response auth.

A process of writing data from the terminal 21 to the IC card 1 and verifying the write process will be described below with reference to steps 59 through 87. In step 59, the terminal 21 transmits a data write request to the IC card using a write command WRITE, including an area number AID-A of a target area of the memory 3 in the IC card 1, a byte count L-1 of write data, and first data M1-1 of write data M1 which is divided into a plurality of data in units of bytes which can be received, as input data, by the IC card 1. In step 61, the IC card 1 finds an area to which the area number AID-A received using the write command WRITE is appended from the area definition table 13. If no corresponding area is found, the IC card 1 transmits a status representing that the area number is not defined to the terminal 21, using a response "write" to the write command WRITE. If such an area is found, the IC card 1 checks whether the previous certificate preparation command EXCH or an encryption preparation command SRND (to be described later) is properly completed.

If it is not properly completed, the IC card 1 transmits an execution condition incompletion error status to the terminal 21, using the response "write". If it is determined that a corresponding command is properly completed, the IC card 1 generates initial data R1a on the basis of the random number data R1 previously notified by the certificate preparation command EXCH and the card unique value held in the IC card 1 by, e.g., an exclusive OR operation.

In step 63, the IC card 1 encrypts the write data M1-1 using the initial data R1a and the key data MMMMM corresponding to the key data number KID-M previously notified by the certificate preparation command EXCH in accordance with the encryption algorithm ALG previously designated by the certificate preparation command EXCH, thus obtaining encrypted data C1-1. In this embodiment, encryption is performed in CBC (Cypher Block Chaining) mode. In a normal encryption mode, encryption can be performed only in units of 8 bytes. Therefore, when data larger than 8 bytes is to be encrypted, the data is divided in units of 8 bytes, and the encryption result of the first divided data is fed back for encryption of the next divided data. Since no feedback value is available when the first divided data is encrypted, the initial data R1a is used as a feedback value.

By referring to the attribute data of the area, an access target, designated by the area number AID-A, it is determined whether the input data M1-1 or the encrypted data C1-1 is written in the memory 3, and a write operation is performed. Thereafter, the IC card 1 transmits a response nb to the terminal 21 so as to request the next write data.

Upon reception of the response nb, the terminal 21 transmits next write data M1-2 to the IC card 1 in step 65. In step 67, when the IC card 1 receives the next write data M1-2, it encrypts the write data M1-2 by using the last 8-byte data of the previously-generated encrypted data C1-1 and the key data MMMMM corresponding to the key data number KID-M in accordance with the encryption algorithm ALG, thus obtaining encrypted data C1-2. The last 8-byte data is used in this case, because encryption is performed in the CBC mode, and the encryption result of the first 8-byte data is reflected in the last 8-byte data. Similar to step 63, it is determined whether the input data M1-2 or the encrypted data C1-2 is written in the memory 3, and corresponding data is selectively written in the area. Thereafter, the IC card 1 transmits a response "nb" to the terminal 21 so as to request the next write data.

Subsequently, the same operation as in steps 65 and 67 is repeated.

When the terminal 21 transmits the last data M1−n of the divided data to the IC card 1 in step 69, the IC card 1 performs the same operation as described above in step 71. As described above, since the encryption result of the first 8-byte data is reflected in the last data, verification of all the data can be performed by transmitting the last data. The IC card 1 transmits the last 8-byte data of the last encrypted data C1−n, as verification data AC1, to the terminal 21 through a response "write" to the write command WRITE.

That is, in the above-described operation, in order to certify the IC card 1 in accordance with the mutual certification procedure, the terminal 21 obtains the verification data AC1 with respect to the write data M1 in advance by using the key data MMMMM for designating the IC card 1, the encryption algorithm ALG, and the random number data R1.

A process of obtaining verification data using key data, an encryption algorithm, and random data which are different from those in the above embodiment will be described below with reference to steps 73 through 81. In step 73, the terminal 21 generates new random data R3 by using the random number generator 25, and transmits it to the IC card 1 as an encryption preparation command SRND together with a key data number KID-A of key data which is used by the IC card 1 to generate verification data, and an encryption algorithm ALGa.

In step 75, when the IC card 1 receives the encryption preparation command SRND, it finds a key data number KID-A from its own key list so as to obtain corresponding key data AAAAA, and transmits a response srnd to the terminal 21.

In step 77, the terminal 21 transmits a data write request to the IC card 1 using a write command WRITE. At this time, the terminal 21 transmits an area number AID-B of a target area of the memory 3 in the IC card 1, a byte count L-2 of write data, and write data M2. Note that in step 77, the byte count of the write data M2 is a byte count which can be received by the IC card 1 as input data.

In step 79, the IC card 1 finds an area to which the area number AID-B is appended from the area definition table 13 in FIG. 2 in the same manner as in step 61. If the previous encryption preparation command SRND (or the certificate preparation command EXCH) is properly completed, the IC card 1 generates initial data R3a on the basis of the random data R3 notified by the encryption preparation command SRND and the card unique value held in the IC card 1. In step 81, the IC card 1 encrypts the write data M2 by using the initial data R3a and the key data AAAAA corresponding to the key data number KID-A previously notified by the encryption preparation command SRND in accordance with the encryption algorithm previously designated by the encryption preparation command SRND, thus obtaining encrypted data C2. By referring to the attribute data of the area, as an access target, designated by the area number AID-B, it is determined whether the input data M2 or the encrypted data C2 is written in the memory 3, and a write operation is performed. Thereafter, the IC card 1 transmits the last 8-byte data of the encrypted data C2, as verification data AC2, to the terminal 21 using a response "write" to the write command WRITE.

Note that IC card 1 recognizes the physical position of a target area in the memory 3 in accordance with start address data and size data in the area definition table 13 in FIG. 2. Start address data is the start address value of the corresponding area, and size data defines the capacity of the area from the start address value. In addition, attribute data consists of one byte. If the MSB of attribute data is "0", it represents an encrypted data write area. If it is "1", it represents an input data write area.

In step 83, when the data write operation in the IC card 1 is completed, the terminal 21 prepares a data write processing list on the basis of the random number data R1 and R3 corresponding to the write data M1 an M2, key data numbers KID-M and KID-A, verification data AC1 and AC2, and the algorithm designation values ALG and ALGa. The prepared list is then transmitted to the center 39.

In step 85, upon reception of the list from the terminal 21, the center 39 extracts the write data M1 from the list, finds key data MMMMM from its own key list by using the corresponding key data number KID-M, and generates verification data ACIX on the basis of corresponding random number data R1 and encryption algorithm ALG in its own transaction list.

In step 87, the center 39 compares corresponding verification data AC1 in its own list with the verification data AC1X generated in step 85. If they coincide with each other, the center 39 verifies the write operation for the write data M1.

Write operations for data after the write data M2 are verified in the same manner as in steps 85 and 87.

An operation of the IC card will be described with reference to FIGS. 4A through 4G.

After the CPU 11 is electrically activated by a control signal from the terminal 21, it outputs initial response data called "answer to reset" to the terminal 21 in step 91. In step 93, the CPU 11 turns off a certificate preparation command completion flag and an encryption preparation command completion flag, and is set in a standby state in step 95.

If the CPU 11 receives instruction data in step 95, it checks in step 97 whether the instruction data is the certificate preparation command EXCH shown in FIG. 5. If NO in step 97, the flow advances to step 131.

If YES in step 97, the CPU 11 picks up the contents of a key data number (KID) field in the certificate preparation command and finds an identical key data number from the key list registered in the memory 3 in step 99.

If the key data number is not found in step 101, the CPU 11 outputs a key data designation error status in step 103, and returns to the standby state. If the key data number is found, the CPU 11 saves corresponding key data in a first key buffer in the internal RAM in step 105.

In step 107, the CPU 11 refers to an encryption algorithm designation data ALG field in the certificate preparation command so as to check the presence/absence of an encryption algorithm resistered in the memory. If the CPU determines in step 109 that no registered encryption algorithm is present, the CPU 11 outputs a designated algorithm error status in step 111 and returns to the standby state in step 95.

If YES in step 109, the CPU 11 saves the number of the encryption algorithm in step 113.

In step 115, the CPU 11 saves the random number R1 of the certificate preparation command, and subsequently finds a key data number KIDa of IC card certificate key data from the key list. If the key data number is not found in step 119, the CPU 11 outputs a key data unregistered error status in step 121 and returns to the standby status. If the key data number is found in step 119, the CPU 11 saves corresponding key data in a second key buffer in the internal RAM in step 123.

In step 125, the CPU 11 generates random number data R2 by using the random number generator 5 and saves it in a second random number buffer in the internal RAM. In step 127, the CPU 11 turns on the certificate preparation command completion flag. In step 129, the CPU 11 outputs the random number data R2, as a response exch to the certificate preparation command, to the terminal 21 together with the key data number KIDa and the contents of the encryption algorithm designation data ALG field in the certificate preparation command. The CPU 11 then returns to the standby state in step 95

If NO in step 97, the CPU 11 checks in step 131 whether the command is the certificate command AUTH shown in FIG. 6. If NO in step 131, the flow advances to step 151.

If YES in step 131, the CPU 11 checks in step 133 whether the certificate preparation command completion flag is turned on. If NO in step 133, the CPU 11 outputs an execution condition incompletion error status in step 135, and returns to the standby state in step 95

If YES in step 133, the CPU 11 causes the encrypter 7 to encrypt the contents of the second random number buffer by using the contents of the second key buffer as encryption key data in step 137. In this case, an encryption algorithm corresponding to the saved encryption algorithm number is used.

In step 139, the CPU 11 compares the encryption result with input data in the certificate command AUTH, and turns on or off a coincidence flag in accordance with the comparison result in step 141 or 145.

In step 147, the CPU 11 causes the encrypter 7 to encrypt the contents of the first random number buffer by using the contents of the first key buffer as encryption key data. In this case, the same encryption algorithm as in step 137 is used. In step 149, the CPU 11 outputs the encryption result, as a response auth to the certificate command AUTH, to the terminal 21 together with the contents of the coincidence flag, and returns to the standby state in step 95.

If NO in step 131, the CPU 11 checks in step 151 whether the command is the encryption preparation command SRND shown in FIG. 7. If NO in step 151, the flow advances to step 175.

If YES in step 151, the CPU 11 picks up the contents of a key data number (KID) field in the encryption preparation command and finds an identical key data number from the key list registered in the memory 3 in step 153.

If the key data number is not found in step 155, the CPU 11 outputs a key data designation error status in step 157, and returns to the standby state. If the key data number is found in step 155, the CPU 11 saves corresponding key data in the first key buffer in the internal RAM in step 159.

In step 161, the CPU 11 refers to an encryption algorithm designation data (ALG) field in the encryption preparation command so as to check the presence/absence of an encryption algorithm registered in the memory. If the CPU determines in step 163 that no registered encryption algorithm is present, it outputs a designated algorithm error status in step 165, and returns to the standby state. If the CPU determines in step 163 that a registered encryption algorithm is present, it saves the number of the encryption algorithm in step 167.

In step 169, the CPU 11 saves the random number data R3 of the encryption preparation command in the first random number buffer in the internal RAM. In step 171, the CPU 11 turns on the encryption preparation command completion flag. In step 173, the CPU 11 outputs an encryption preparation command completion status to the terminal 21, and returns to the standby state in step 95.

If NO in step 151, the CPU 11 checks in step 175 whether the command is the write command WRITE shown in FIG. 8A or 8B. If NO in step 175, the CPU 11 checks whether the command is, e.g., a read command, and advances to a corresponding step. If YES in step 175, the CPU 11 checks in step 177 whether the write command has a format shown in FIG. 8A or 8B. If it has the format shown in FIG. 8A, the CPU 11 refers to the certificate preparation command completion flag or the encryption preparation command completion flag in step 179. The CPU 11 then checks in step 181 whether any one of the flags is turned on. If NO in step 181, the CPU 11 outputs a condition incompletion status in step 183, and returns to the standby state. If YES in step 181, the CPU 11 saves the contents of the data portion of the write command in a second write buffer of the RAM in step 185.

If it is determined in step 177 that the write command has the format shown in FIG. 8B, the CPU 11 checks in step 187 whether a write command continuation flag held therein is ON. If NO in step 187, the CPU 11 outputs a request error status in step 189, and returns to the standby state in step 95. If YES in step 187, the CPU 11 appends the contents (input data) of the data portion of the write command to the contents of a data save buffer in the internal RAM and saves it in the second write buffer in the internal RAM in step 191.

In step 193, the CPU 11 saves only the contents (input data) of the data portion of the write command in a first write buffer in the internal RAM.

In step 195, the CPU 11 checks whether succeeding data to be written is present in the input data sent using the write command shown in FIG. 8A or 8B. If YES in step 195, the CPU 11 turns on a continuation flag in step 197. If NO in step 195, the CPU 11 turns off the continuation flag in step 199.

In step 201, the CPU 11 checks whether the number of bytes in the second write buffer in the internal RAM is, e.g., a multiple of 8. If YES in step 201, the flow shifts to step 213. If NO in step 201, the CPU 11 performs padding processing for the data in the second write buffer in the internal RAM (for example, appending "20" Hex data to the end of the data) so as to generate data corresponding to a multiple of 8 in step 205, and the flow shifts to step 213.

If YES in step 203, the CPU 11 leaves data corresponding to a multiple of 8 and saves the rest of the data in the data save buffer in the internal RAM in step 209. That is, if 18-byte data is present in the second write buffer, only 16-byte data is left while the remaining 2-byte data is saved in the data save buffer. If it is determined in step 209 that the second write buffer in the internal RAM is empty, the flow shifts to step 213.

If the second write buffer in the internal RAM is empty (for example, if 7-byte data is stored in the second write buffer, all the data in the buffer is transferred to the data save buffer. As result, the second write buffer becomes empty) in step 209, the CPU 11 checks in step 211 whether the currently accessed area is to be encrypted during a write operation. If NO in step 211, the flow advances to step 215. If YES in step 211, the flow advances to step 213.

In step 213, the CPU 11 causes the encrypter 7 to encrypt the data in the second write buffer in the internal RAM in accordance with the CBC mode. If the continuation flag is OFF in this case, a value obtained by an exclusive OR of the contents of the first random number buffer in the internal RAM with the card unique value is used as an initial value for the encryption operation using the CBC mode. If the continuation flag is ON, the last 8-byte data of the data encrypted in the previous write operation is used as an initial value. In addition, in this case, the contents of the first key buffer are used as key data, and an encryption algorithm is selectively used in accordance with a held encryption algorithm number. When this processing is completed, the flow advances to step 215.

In step 215, the CPU 11 checks whether the continuation flag is ON. If NO in step 215, the CPU 11 checks in step 217 whether the access target area is an area to be encrypted. If NO in step 217, the CPU 11 appends a byte count LX of the write data in the write command to the contents of the first write buffer in the internal RAM and writes it in the access target area in the memory 3 in step 219. If YES in step 217, the CPU 11 sets the minimum value of a multiple of 8 larger than the byte count LX of the write data as a value LXa, and writes it in the target area by appending it to the contents in the second write buffer in step 221.

If YES in step 215, the CPU 11 checks in step 223 whether the access target area is an area to be encrypted. If NO in step 223, the CPU 11 writes the contents of the first write buffer of the internal RAM in the target area by appending it to the previously-written data in step 225. If YES in step 223, the CPU 11 writes the contents of the second write buffer of the internal RAM in the access target area in the same manner a described above in step 227.

After the data is written, the CPU 11 checks in step 229 whether the continuation flag is ON. If YES in step 229, the CPU 11 turns on the continuation flag and outputs a response nb in step 231, and returns to the standby state. If NO in step 229, the CPU 11 outputs the last 8-byte of the contents of the second write buffer in the internal RAM and turns off the continuation flag in step 233, and returns to the standby state.

In this manner, one key data and one encryption algorithm of a plurality of key data and a plurality of encryption algorithms held in the IC card are designated by the terminal, and data to be written is encrypted by using the designated key data and encryption algorithm. Therefore, even if the IC card is used in a plurality of applications, verification key data and encryption algorithms can be selectively used for the respective applications, and security between the applications can be ensured.

Note that the random number data R1 and R3 to be transmitted from the terminal 21 to the IC card 1 may have the same contents in each operation. However, if they are changed in each operation, different encrypted data are output as long as write operations are performed at different points of time, even if identical write data, key data, and encryption algorithms are used. Hence, verification of data is facilitated.

In this case, if, for example, a clock circuit is arranged in the terminal 21, and random number data R1 and R3 are generated by using time data generated by the clock circuit, different data can be easily obtained in each operation.

What is claimed is:

1. An IC card system having an IC card and an external device which exchange certification data to certify each other, comprising:
    an IC card including:
    data storage means for storing a plurality of data used by the IC card; including
    a first storage section for storing a plurality of key data;
    a second storage section for storing a plurality of encryption algorithms; and
    a third storage section for storing a command to be executed by the IC card, the command being sent from said external device;
    a first contractor for communicating with the external device;
    first designation means for designating a first pair of key data and an encryption algorithm stored in said data storage means of said IC card, and said external device, respectively;
    data generating means for generating first and second certification data;
    first encryption means for encrypting the first certification data by using the first pair of key data and the encryption algorithm read out from said data storage means in said IC card to deliver a first encryption output;
    first comparison means for comparing the first encryption output from said first encryption means in said IC card and a second encryption output obtained in said external device to deliver a first coincidence output;
    reading means for reading out a second pair of key data and an encryption algorithm from said data storing means in accordance with second designation data sent from the external device;
    second encryption means for encrypting the second certification data by using the second pair of key data and the encryption algorithm designated by the external device to deliver a second encryption output in response to the first coincidence output delivered from the first comparison means; and
    said external device including:
    data storage means for storing a plurality of data including:
    a fourth storage second for storing a plurality of key data; and
    a fifth storage section for storing a plurality of encryption algorithms;
    a second contractor including means for connecting with the first contactor for communicating with the IC card;
    third encryption means for encrypting the first certification data to deliver a second encryption output by using the first pair of key data and the encryption algorithm read out from the fourth and fifth storage sections in accordance with the first designation data sent from the IC card;
    second designation means for designating a second pair of key data from said fourth storage section, and designating the encryption algorithm stored in said IC card, respectively;
    fourth encryption means for encrypting the second certification data by using the second pair of key data and the encryption algorithm read out from the third and fourth storing means to deliver a fourth encryption output when the first coincidence output is delivered from the first comparison means;
    second comparison means for comparing the fourth encryption output with the second encryption output to deliver a second coincidence output;
    means for delivering an output representing that the IC card is valid when the second coincidence output is delivered from said comparison means; and
    means for sending the command to the IC card when the output is delivered from the output delivering means.

2. A certification method for an IC card system utilizing an IC card having a plurality of key data and a plurality of encryption algorithms and an external device having a plurality of key data and a plurality of encryption algorithms, the external device and the IC card exchanging certification data to certify each other, the method comprising the steps of:
    sending from the IC card to the external device a first designation data for designating a first pair of key data and an encryption algorithm stored in said external device;

reading out the first pair of key data and the encryption algorithm stored in said IC card;

generating first and second certification data;

encrypting the first certification data using the first pair of key data and the encryption algorithm read out from said IC card, to deliver a first encryption output;

comparing the first encryption output obtained in said IC card and a second encryption output obtained in said external device to deliver a first coincidence output;

reading out a second pair of key data and an encryption algorithm from said IC card in accordance with a second designation data sent from the external device;

encrypting the second certification data by using the second pair of key data and the encryption algorithm designated by the external device to deliver a second encryption algorithm output in response to the first coincidence output;

encrypting the first cerification data to deliver a second encryption output by using the first pair of key data and the encryption algorithm read out from the external device in accordance with the first designation data sent from the IC card;

designating a second pair of key data and the encryption algorithm stored in said external device;

encrypting the second certification data by using the second pair of key data and the encryption algorithm read out from the external device to deliver a fourth encryption output when the first coincidence output is delivered;

comparing the fourth encryption output with the second encryption output to deliver a second coincidence output;

producing a valid output signal signifying that the IC card is valid when the second coincidence output is obtained; and sending a command from the external device to the IC card requesting further processing when the valid output signal is delivered at the output delivering step.

* * * * *